(12) United States Patent
Kruppe, III

(10) Patent No.: US 11,506,304 B2
(45) Date of Patent: Nov. 22, 2022

(54) INDICATORS FOR VALVES

(71) Applicant: Cyrus Shank Corporation, Aurora, IL (US)

(72) Inventor: Frank P. Kruppe, III, Aurora, IL (US)

(73) Assignee: CYRUS SHANK CORPORATION, Aurora, IL (US)

( * ) Notice: Subject to any disclaimer, the term of this patent is extended or adjusted under 35 U.S.C. 154(b) by 41 days.

(21) Appl. No.: 16/817,765

(22) Filed: Mar. 13, 2020

(65) Prior Publication Data

US 2021/0285567 A1 Sep. 16, 2021

(51) Int. Cl.
| | |
|---|---|
| *F16K 37/00* | (2006.01) |
| *F16K 17/164* | (2006.01) |
| *F16K 27/04* | (2006.01) |
| *G01L 7/16* | (2006.01) |
| *F16K 15/06* | (2006.01) |

(52) U.S. Cl.
CPC ........ *F16K 37/0058* (2013.01); *F16K 15/063* (2013.01); *F16K 17/164* (2013.01); *F16K 27/041* (2013.01); *F16K 37/005* (2013.01); *G01L 7/163* (2013.01); *G01L 7/166* (2013.01)

(58) Field of Classification Search
CPC .. F16K 37/005; F16K 37/0058; F16K 15/063; F16K 17/164; G01L 7/163; G01L 7/166
See application file for complete search history.

(56) References Cited

U.S. PATENT DOCUMENTS

| | | | | |
|---|---|---|---|---|
| 1,631,714 | A | * | 6/1927 | Wellman .................. G01L 7/16 73/744 |
| 3,738,311 | A | * | 6/1973 | Appleton ................. G01L 7/16 116/272 |
| 4,072,126 | A | * | 2/1978 | Kemp ................ F16K 37/0066 251/63 |
| 4,567,791 | A | * | 2/1986 | Sato .................... F16H 61/0251 116/272 |
| 5,067,511 | A | * | 11/1991 | Taylor .................. F16K 17/164 137/67 |
| 5,516,077 | A | * | 5/1996 | Roberts ................... F16K 27/02 251/148 |
| 9,022,065 | B1 | | 5/2015 | Kliewer et al. |
| 2014/0109823 | A1 | * | 4/2014 | Leavitt .................... G01L 7/166 116/268 |

OTHER PUBLICATIONS

PopEye/Hansen Technologies, Industrial Refrigeration Valves & Controls, Hansen Products https://www.hantech.com/popeye, Eliminates Hazards & Facilitates Compliance, downloaded Jun. 17, 2020, 2 pages.

* cited by examiner

*Primary Examiner* — Atif H Chaudry
(74) *Attorney, Agent, or Firm* — Thompson Coburn LLP

(57) ABSTRACT

An indicator adapted to provide a visual indication of an over pressure situation in a system. The indicator (also referred to as a pop indicator), includes a main body, a piston that is disposed in the main body, and one or more O-rings disposed around the piston. Initially, the piston is in a first position where the piston is retracted into the body. However, when an over pressure situation occurs, the pressure causes the piston to move in a direction out of the main body against a friction force created by the O-ring. When the piston is moved, i.e., popped, then end of the piston extending out of the body provides a visual indication.

13 Claims, 15 Drawing Sheets

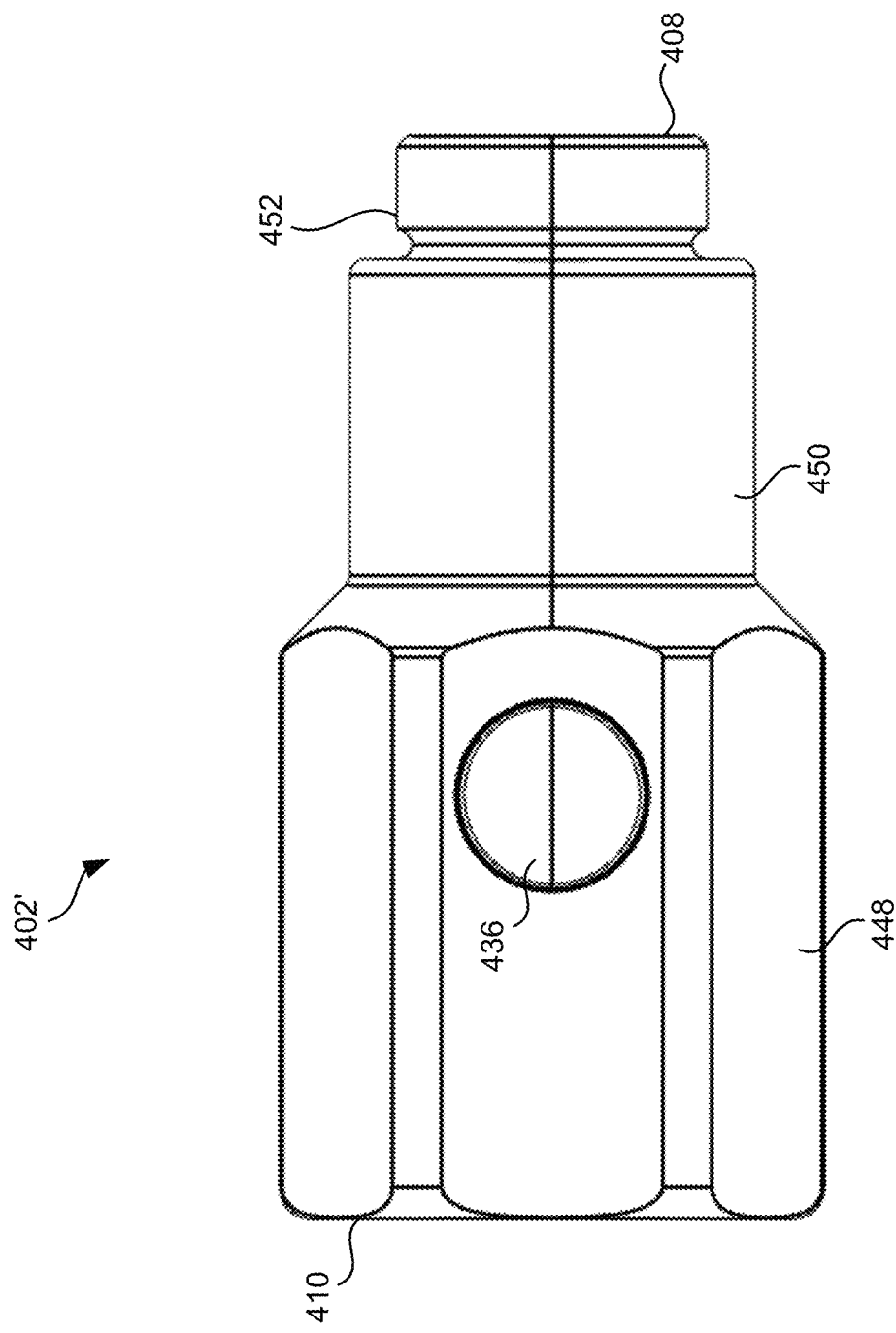

US 11,506,304 B2

INDICATORS FOR VALVES

FIELD OF THE INVENTION

The present invention relates generally to indicators adapted to be coupled to valves. More particularly, the present invention relates to indicators that provide a visual indication of whether a pressure relief valve has been activated.

BACKGROUND

Pressure relief valves are commonly used in many industries, such as the refrigeration industry. Pressure relief valves are used to control the amount of pressure within systems and containers, and flow through such systems and into and out of containers. For example, if pressure within a system or container increases too high, the pressure relief valve is activated and provides a mechanism for reducing the amount of pressure, thus protecting the system or container from pressure related failure. In general, pressure relief valves are replaced every five years, or sooner if the pressure relief valve is activated prior to the five years. However, it can be difficult and time consuming to identify whether a pressure relief valve has been activated, and thus should be replaced.

Solenoid-type valves are also commonly used in many industries as a type of pressure reduction valve. However, fluid pressure can build up in a system and may require a bleed off operation to be performed. It can be difficult to identify whether a bleed off operation should be performed to remove fluid (liquid or gas) from the system.

SUMMARY OF THE INVENTION

The present invention relates broadly to indicators adapted to provide a visual indication of whether a pressure relief valve has been activated due to an over pressure situation in a system. In an embodiment, the indicator (also referred to as a pop indicator), includes a main body, a piston disposed in the main body, and one or more O-rings disposed around the piston. Initially, the piston is in a first position, wherein the piston is retracted into the body, thus providing an indication that an over pressurization event has not occurred. However, when an over pressure situation occurs, the increased pressure causes the piston to move in a direction outwardly from the main body and against a friction force created by the O-ring. When the piston is moved—i.e., popped outwardly—an end of the piston extends outwardly of the body, thus providing a visual indication that an over-pressurization event has occurred. For example, the indicator may also be coupled to a pressure relief valve, and provide an indication that the pressure relief valve has been activated. In another example, the indicator may be coupled to a solenoid valve, and indicate that a system has experienced an overpressure situation, and fluid (liquid or gas) should be removed from the system to decrease the pressure.

An embodiment of the present invention broadly comprises an indicator adapted to be coupled to a valve, such as a pressure relief valve. The indicator includes a body having opposing first and second body ends, wherein the second body end is adapted to be coupled to the valve. A bore extends through the body between the first and second body ends. A piston having opposing first and second piston ends is disposed in the bore. The piston is movable between a retracted position, wherein the first piston end is disposed proximal to the first body end, and an extended position, wherein the first piston end is extended out of the body to provide a visual indication that an over-pressurization event, and thus activation of the pressure relief valve, has occurred.

Another embodiment of the present invention broadly comprises an indicator adapted to be disposed in a pressurized system. The indicator includes a body having opposing first and second body ends, wherein the second body end is adapted to be coupled to and be in either direct or indirect fluid communication with the system. A bore extends through the body between the first and second body ends. A piston having opposing first and second piston ends is disposed in the bore. The piston is movable between a retracted position, wherein the first piston end is disposed proximal to the first body end, and an extended position, wherein the first piston end is extended out of the body to provide a visual indication that pressure in the system has reached a threshold value.

BRIEF DESCRIPTION OF THE DRAWINGS

For the purpose of facilitating an understanding of the invention, there are illustrated in the accompanying drawings embodiments thereof, from an inspection of which, when considered in connection with the following description, the invention, its construction and operation, and many of its advantages should be readily understood and appreciated.

FIG. 20 is a side view of an alternative body portion for the third indicator, according to an embodiment of the present invention.

DETAILED DESCRIPTION OF THE PRESENT INVENTION

Figure 1:
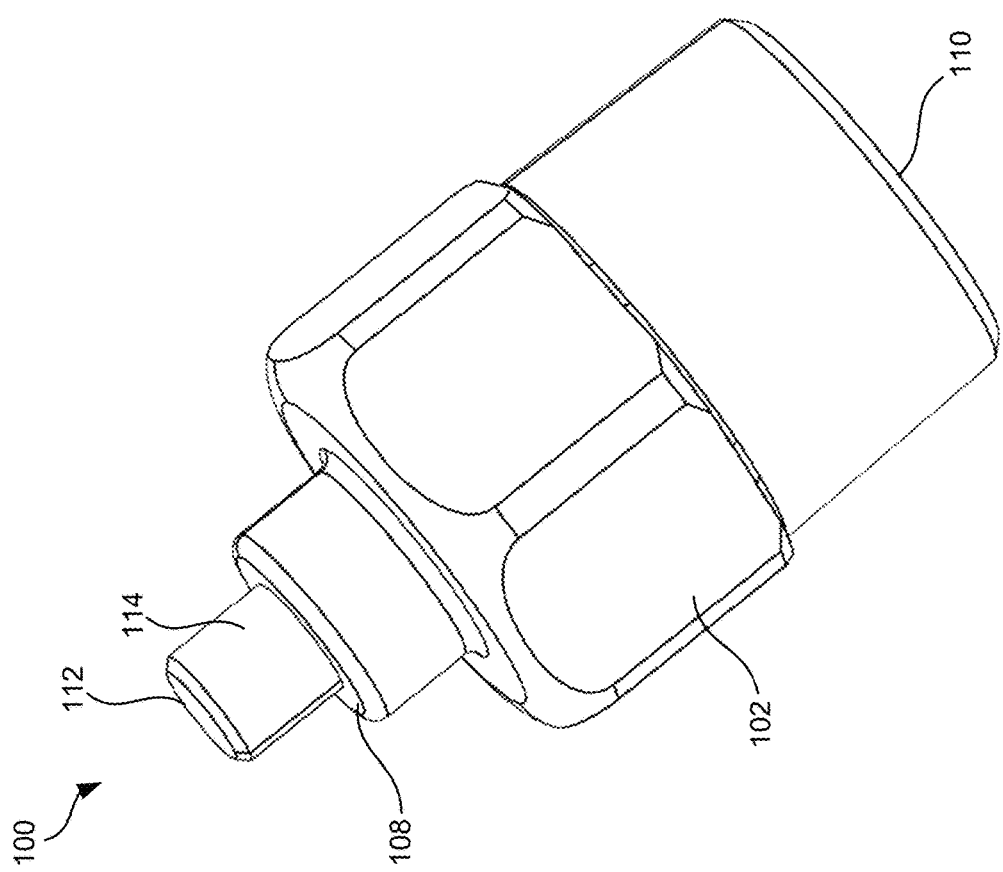
FIG. 1 is a perspective view of a first indicator for a valve, according to an embodiment of the present invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

Embodiments of the present invention generally relate to indicators adapted to provide a visual indication of an over pressure situation in a system, such as a refrigeration type system. In general, the indicator (also referred to as a pop indicator), includes a main body, a piston that is disposed in the main body, and one or more O-rings disposed around the piston. Initially, the piston is disposed in a first position, wherein the piston is retracted into the body, and is maintained in such position due to friction caused by the O-ring/inner surface of the bore interface. However, when an over-pressurization situation occurs, the increased amount of pressure causes the piston to overcome the frictional interaction between the O-ring/bore interface, and thus move the piston in a direction outwardly of the main body. When the piston is moved, i.e., popped, an end of the piston extends out of the body, and thus provides a visual indication that an over-pressurization event has occurred. For example, the indicator may be coupled to a pressure relief valve, and indicate that the pressure relief valve has been activated due to an over-pressurization event, thus indicating that the valve should be replaced or otherwise reset. In another example, the indicator may be coupled to a solenoid valve, and indicate that a system is experiencing an overpressure situation, and fluid (liquid or gas) should be removed from the system to reduce the pressure.

Figure 2:
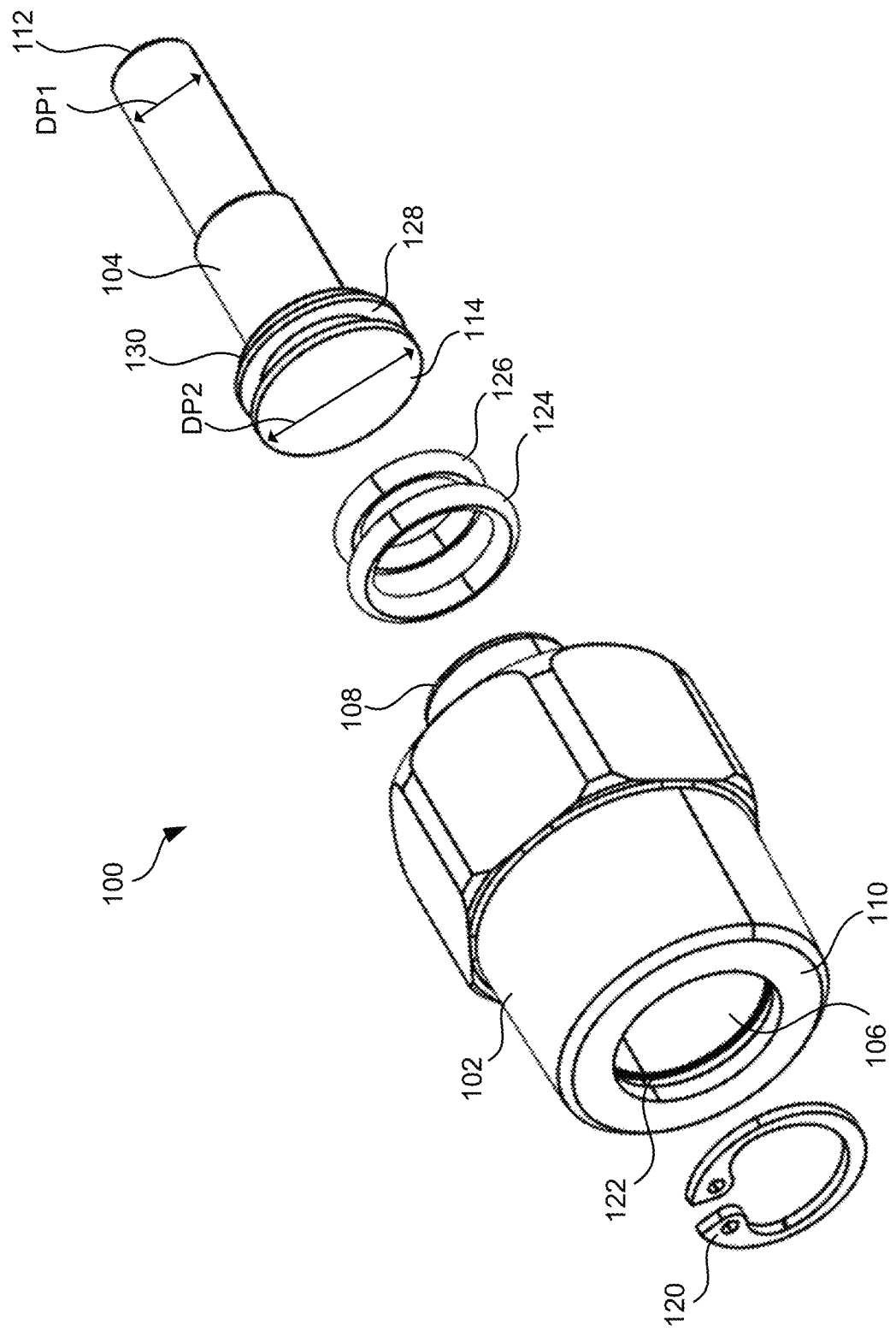
FIG. 2 is an exploded view of the first indicator of FIG. 1.

Referring to FIGS. 1 and 2, an indicator 100 includes a body 102 and a piston 104. The body 102 includes a bore 106 extending from a first end 108 to an opposing second end 110 of the body 102. The piston 104 is disposed in the bore 106, with a first end 112 disposed proximal to the first end 108 of the body 102, and a second end 114 disposed in the bore 106 between the first and second ends 108, 110 of the body 102.

Figure 4:
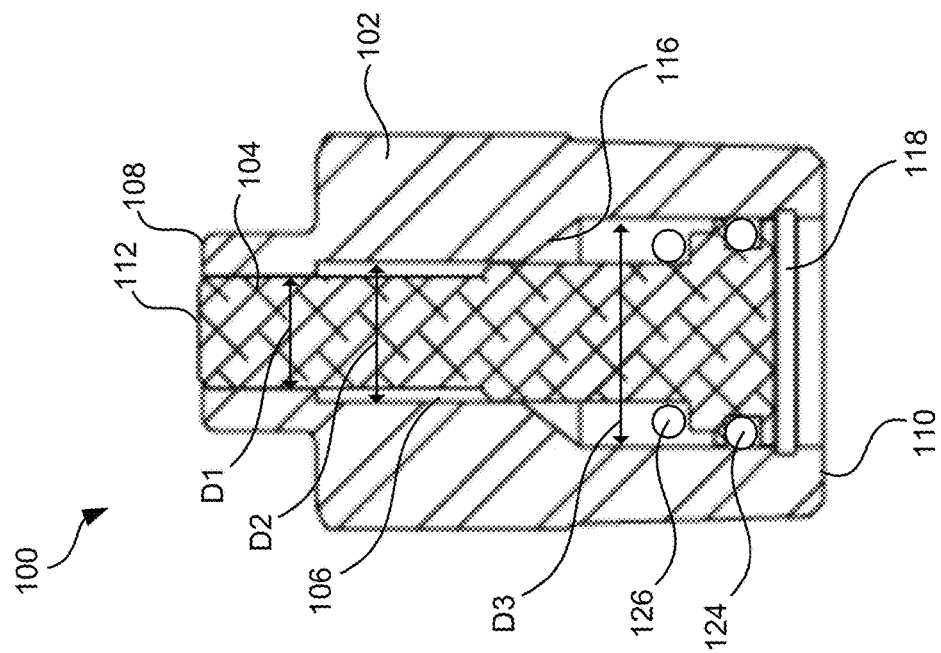
FIG. 4 is a section view of the first indicator of FIG. 3, disposed in the first or retracted position.
Figure 6:
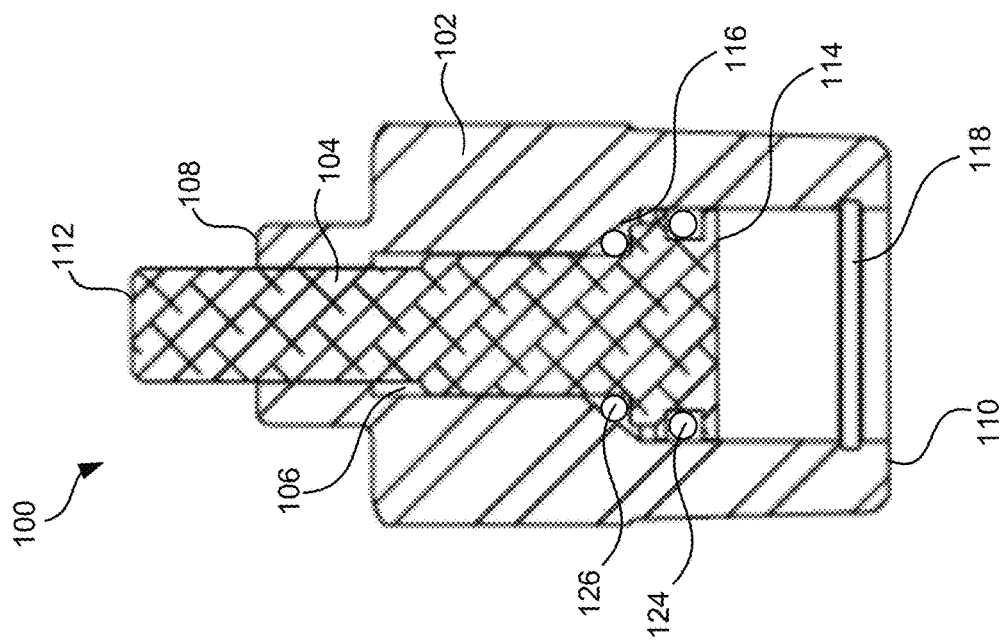
FIG. 6 is a section view of the first indicator of FIG. 5, disposed in the second or extended position.

Referring also to FIGS. 2 and 4, the bore 106 has a first diameter D1 proximal to the first end 108 of the body 102. The bore 106 transitions from the first diameter D1 to a second diameter D2 (larger than the first diameter D1) as the bore 106 extends from the first end 108 in a direction towards the second end 110 of the body 102. The bore 106 transitions from the second diameter D2 to a third diameter D3 (larger than the second diameter D2) as the bore 106 continues to extend in the direction towards the second end 110 of the body 102. The transition from the second diameter D2 to the third diameter D3 may include, for example, an angled portion 116 that may provide a seat for the piston 104 when the piston 104 is disposed in the extended position (as illustrated in FIG. 6, discussed in further detail below.

The body 102 may also include a stop 118 disposed proximal to the second end 110 of the body. As illustrated, the stop 118 may include a retaining ring 120 that is disposed in a groove 122 in the body 102 proximal to the second end 110 of the body 102), thus preventing the piston 104 from extending completely out of the body 102

One or more O-rings 124, 126 may also be disposed around the piston 104. Referring to FIG. 2, the piston 104 may include a first piston diameter DP1 proximal to the first end 112 of the piston 104, and a second piston diameter DP2 proximal to the second end 114 of the piston 104. The first piston diameter DP1 may be smaller than the first diameter D1 of the bore 106 to allow the piston 104 to be slidably received within the bore 106. The second piston diameter DP2 may also be larger than the second diameter D2 and smaller than the third diameter D3 of the bore 106 to allow the piston 104 to be slidably received within the bore 106.

The piston 104 may also include a groove 128 disposed proximal to the second end 114. The first O-ring 124 may be disposed in the groove 128, and the second O-ring 126 may be disposed on a flange 130 of the piston 104 that is further away from the second end 114 than the groove 128. The O-rings may be any suitable material. For example, in an embodiment, the O-rings may be hydrogenated nitrile butadiene rubber (HNBR).

During assembly, the O-rings 124, 126 may be disposed on the piston 104, and the piston 104 may be inserted into the bore 106 of the body 102 via the second end 110. The retaining ring 120 is then disposed in the groove 122 to retain the piston 104 in the body 102, and prevent the piston 104 from extending completely out of the second end 110 of the body 102. The first and second diameters D1, D2 may also prevent the piston 104 from moving out of the body 102 at the first end 108.

Figure 3:
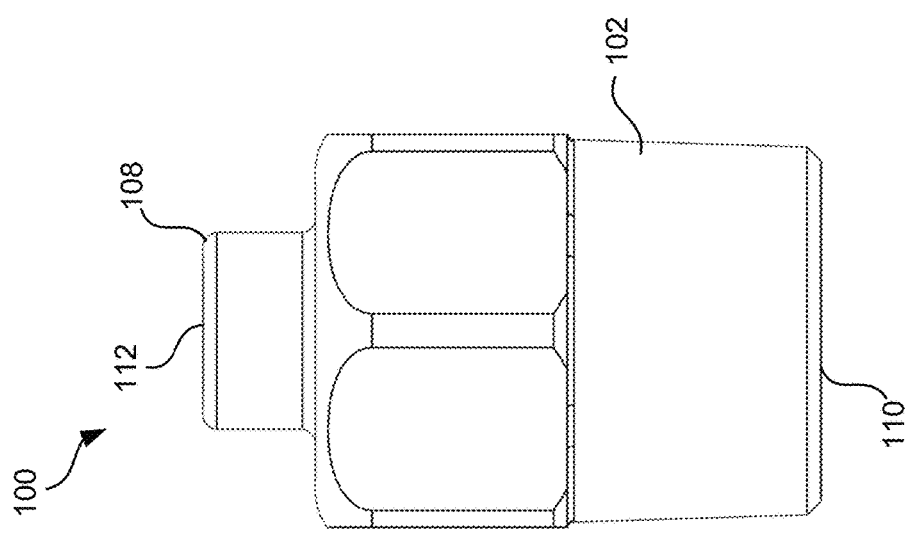
FIG. 3 is a side view of the first indicator of FIG. 1, disposed in a first or retracted position.

Referring to FIGS. 3 and 4, the piston 104 is shown disposed in a first position or retracted position with respect to the body 102. In the first position, the first end 112 of the piston 104 is substantially in line or flush with the first end 108 of the body 102. The second end 114 of the piston 104 is also disposed substantially adjacent to the stop 118 (or the retaining ring 120). In this position, the O-rings 124, 126 provide a substantially fluid tight seal between the piston 104 and internal surface of the bore 106 of the body 102, as well as a frictional interaction between the O-rings 124, 126 and inner surface of the bore 106. This substantially prevents fluid (liquid or gas) from flowing through the bore 106.

Figure 5:
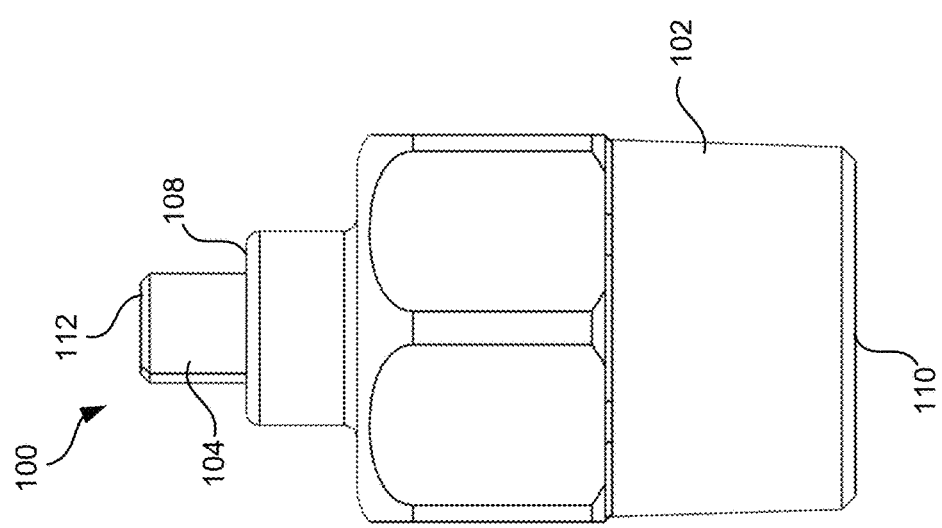
FIG. 5 is a side view of the first indicator of FIG. 1, disposed in a second or extended position.

Referring to FIGS. 5 and 6, the piston 104 is shown disposed in a second position or extended position with respect to the body 102. In the second position, the first end 112 of the piston 104 is extended from the first end 108 of the body 102. The second end 114 of the piston 104 is also disposed proximal to the angled portion 116, with the second O-ring 126 seated against the angled portion 116. In this position, the O-rings 124, 126 provide a substantially fluid tight seal between the piston 104 and internal surface of the bore 106 of the body 102. This substantially prevents fluid (liquid or gas) from flowing through the bore 106.

In an example, the indicator 100 may be coupled to a pressure relief valve. For example, the indicator 100 may be threaded into, integrated into, or otherwise coupled to a cap portion of a pressure relief valve. The opening of the bore 106 at the second end 110 of the body 102 may function as an inlet port that receives fluid pressure when the pressure relief valve is actuated.

For example, the indicator 100 may initially be disposed with the piston 104 in the first or retracted position (as illustrated in FIGS. 3 and 4). When fluid pressure increases, at least a portion of that fluid may enter the opening of the bore 106 at the second end 110 of the body 102 and act on the second end 114 of the piston 104. This causes the piston 104 to slidably move against the frictional interaction caused by the O-rings 124 and/or 126 acting against the internal surface of the bore 106, thus causing the piston 104 to slide to the extended position (as illustrated in FIGS. 5 and 6). The piston 104, being disposed in the extended position, provides a visual indication that an over-pressurization has occurred, thus causing the pressure relief valve to be activated, which may then require replacement or servicing. The piston 104 may also be colored (for example, red, yellow, orange) or other easily identifiable color, to provide a more visually identifiable indication that the pressure relief valve has been activated, and may need to be replaced.

It should be appreciated that while the pressure relief valve may require replacement, the indicator 100 may be reused, by decoupling the indicator from the actuated pressure relief valve and coupling the indicator 100 to a new or replacement pressure relief valve. The indicator 100 may be reset or placed in the retracted position by pushing or otherwise moving the piston 104 back to the retracted position.

Figure 7:
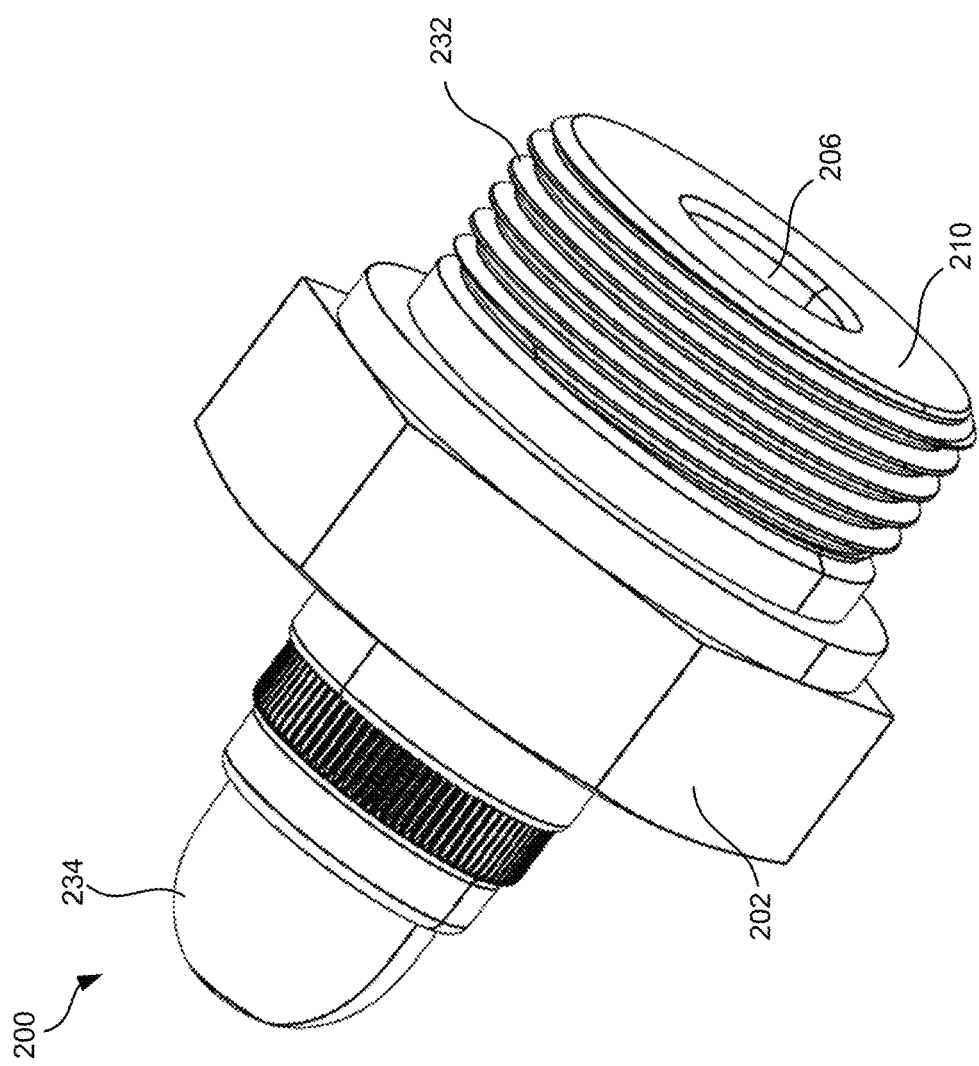
FIG. 7 is a perspective view of a second indicator for a valve, according to an embodiment of the present invention.
Figure 8:
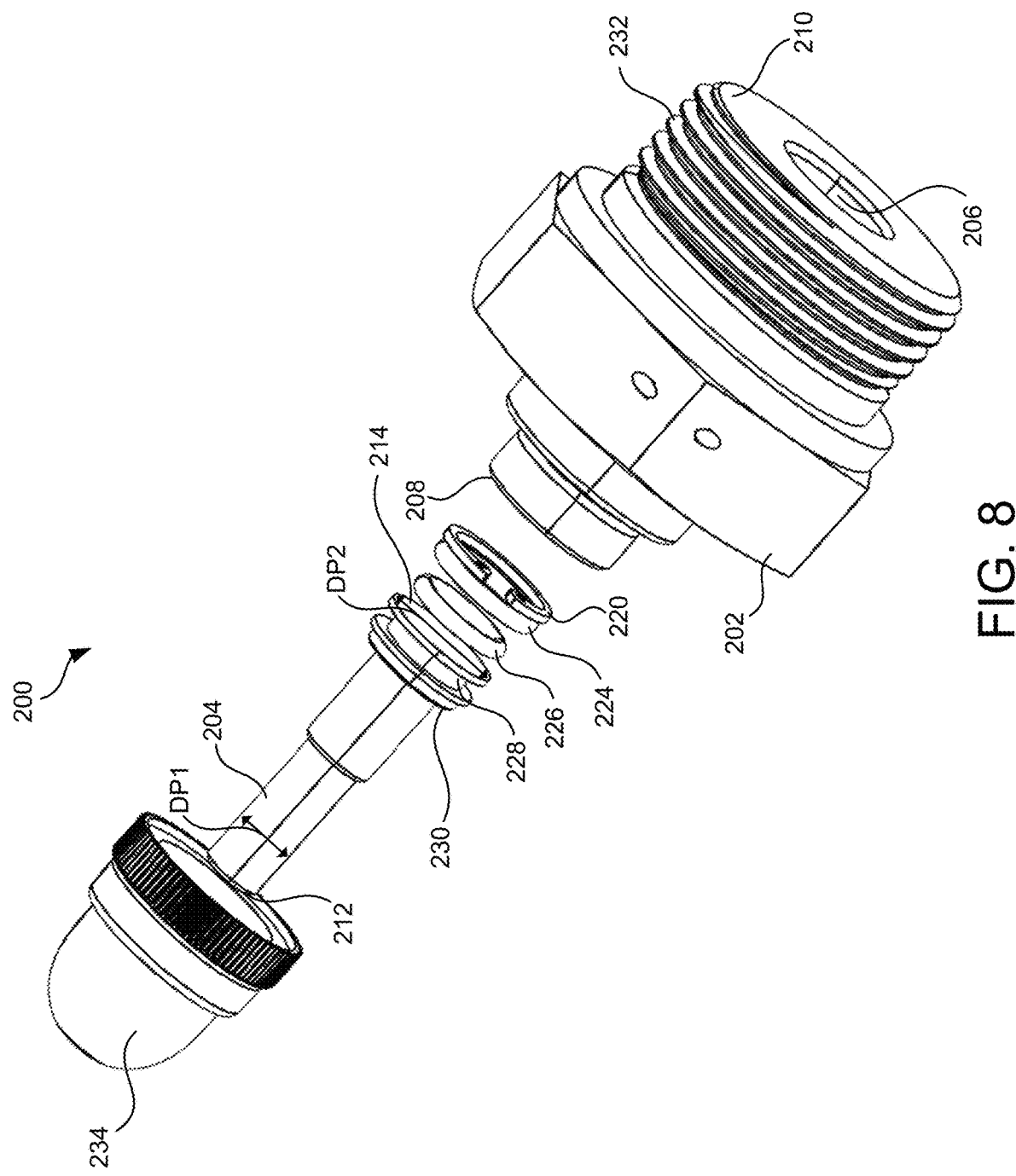
FIG. 8 is an exploded view of the second indicator of FIG. 7.
Figure 13:
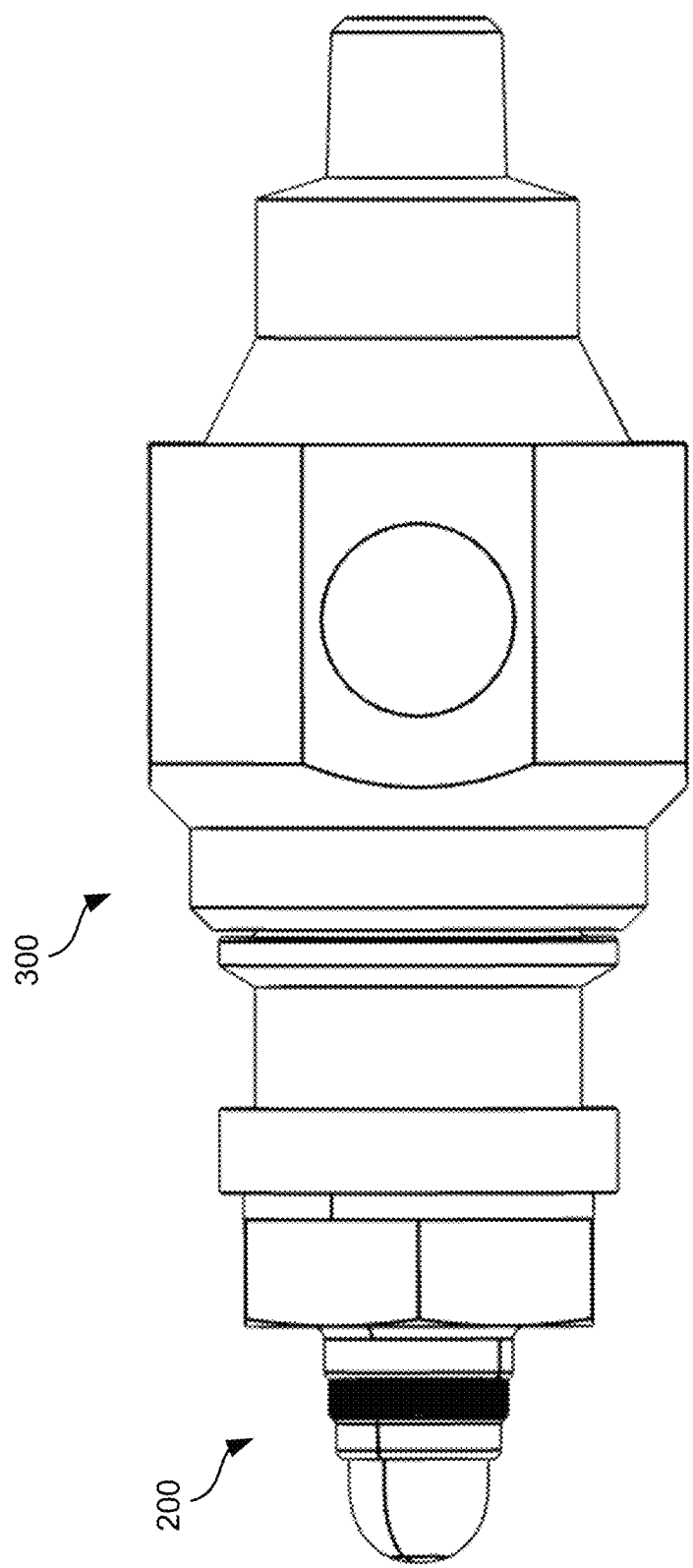
FIG. 13 is a side view of the second indicator of FIG. 7 coupled to a pressure relieve type valve.
Figure 14:
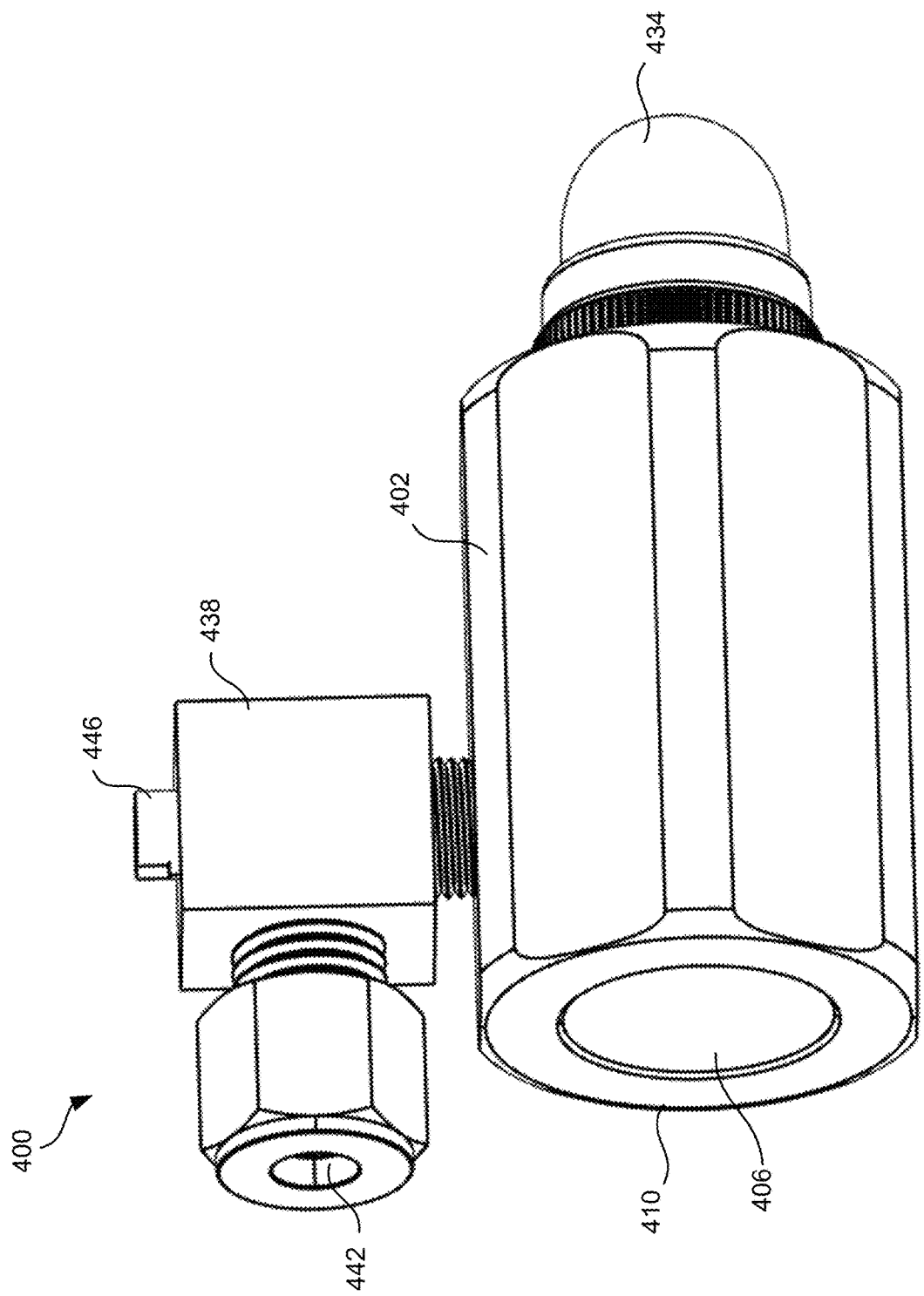
FIG. 14 is a perspective view of a third indicator for a valve, according to an embodiment of the present invention.
Figure 15:
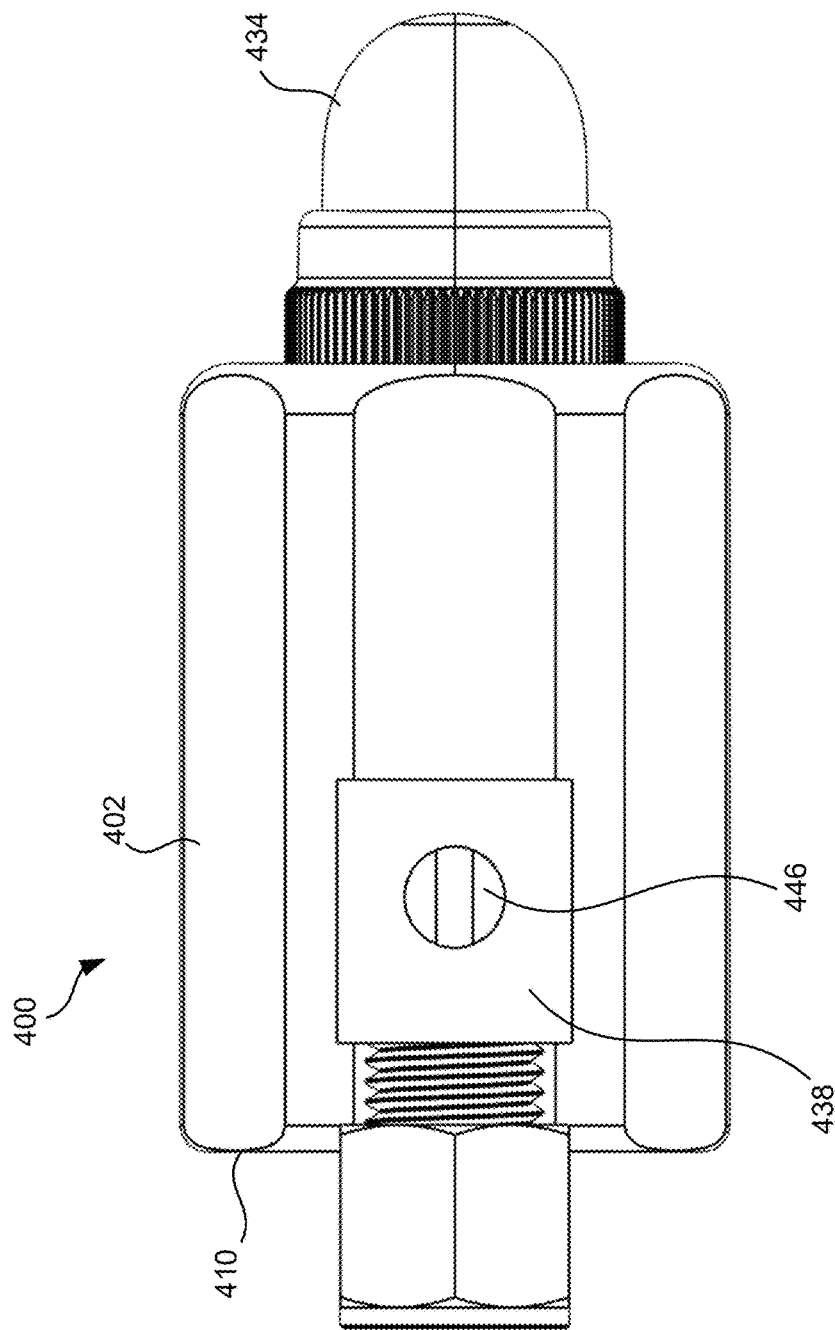
FIG. 15 is a side view of the third indicator of FIG. 14.

Referring to FIGS. 7 and 8, in an embodiment, an indicator 200 may be directly coupled to a pressure relief valve, and may be used as a cap portion of the pressure relief valve. For example, the indicator 200 may be the cap part of a pressure relief valve body 300 (as illustrated in FIG. 13).

Figure 10:
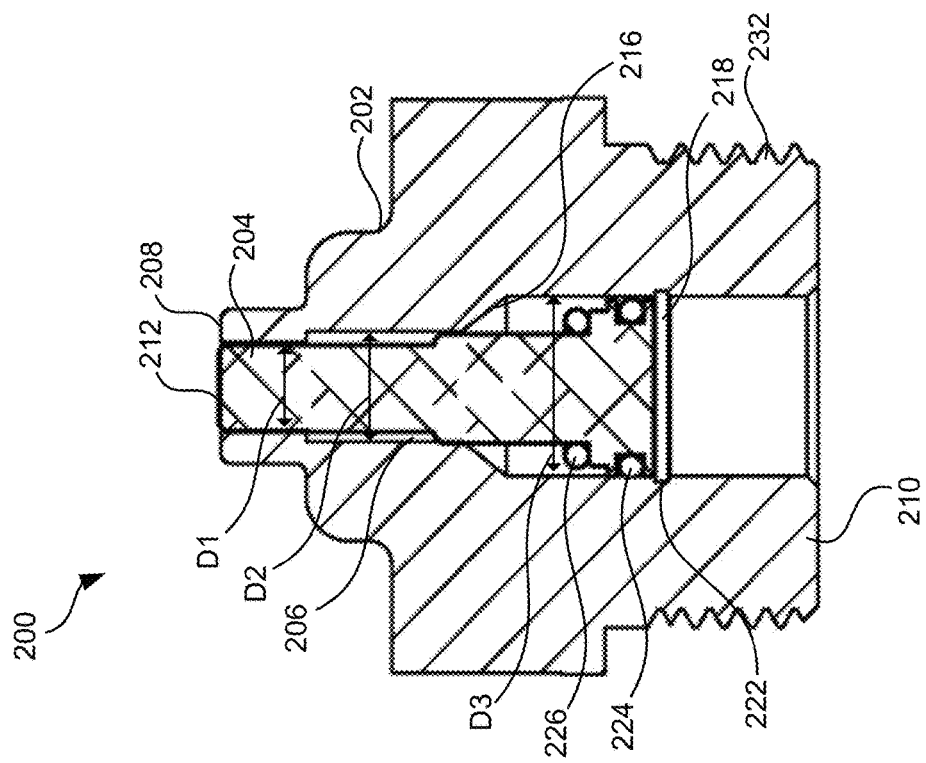
FIG. 10 is a section view of the second indicator of FIG. 9, disposed in the first or retracted position.

As illustrated in FIGS. 7, 8, and 10, in an embodiment, the indicator 200 is similar to the indicator 100. The indicator 200 includes a body 202 and a piston 204. The body 202 includes a bore 206 extending from a first end 208 to an opposing second end 210 of the body 202. The piston 204 is slidably received in the bore 206, with a first end 212 disposed proximal to the first end 208 of the body 202, and a second end 214 disposed in the bore 206 between the first and second ends 208, 210 of the body 202.

Figure 12:
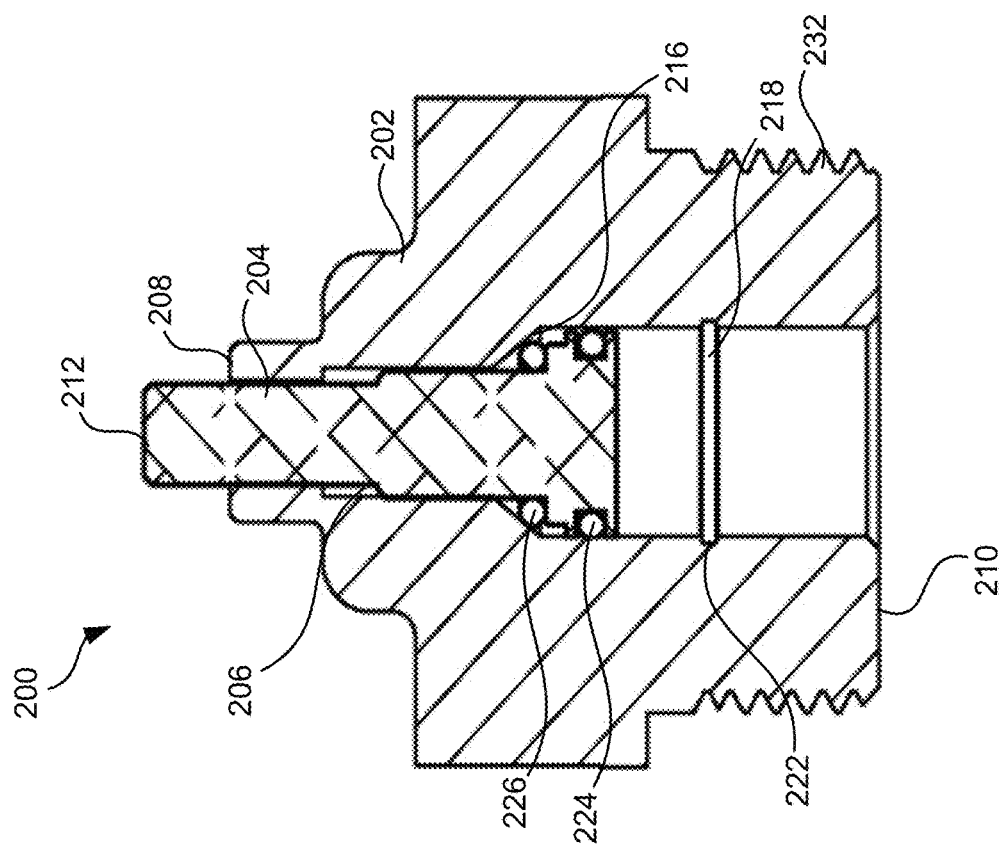
FIG. 12 is a section view of the second indicator of FIG. 11, disposed in the second or extended position.

The bore 206 has a first diameter D1 proximal to the first end 208. The bore 206 transitions from the first diameter D1 to a second diameter D2 (larger than the first diameter D1) as the bore 206 extends from the first end 208 in a direction towards the second end 210. The bore 206 also transitions from the second diameter D2 to a third diameter D3 (larger than the second diameter D2) as the bore 206 continues to extend in the direction towards the second end 210. The transition from the second diameter D2 to the third diameter D3 may include an angled portion 216 that may provide a seat for the piston 204, when the piston 204 is disposed in the extended position (as illustrated in FIG. 12, discussed in further detail below).

The body 202 may also include a stop 218 disposed proximal to the second end 210. As illustrated, the stop 218 may include a retaining ring 220 disposed in a groove 222 in the body 202 proximal to the second end 210.

One or more O-rings 224, 226 may also be disposed around the piston 204. Referring to FIG. 8, in an embodiment, the piston 204 may include a first piston diameter DP1 proximal to the first end 212 of the piston 204, and a second piston diameter DP2 proximal to the second end 214. The first piston diameter DP1 may be smaller than the first diameter D1 of the bore 206 to allow the piston 204 to slide within the bore 206. The second piston diameter DP2 may also be larger than the second diameter D2 and smaller than the third diameter D3 of the bore 206 to allow the piston 204 to slide within the bore 206.

The piston 204 may also include a groove 228 disposed proximal to the second end 214. The first O-ring 224 may be disposed in the groove 228, and the second O-ring 226 may be disposed on a flange 230 of the piston 204 that is further away from the second end 214 than the groove 228. The O-rings may be any suitable material. For example, in an embodiment, the O-rings may be hydrogenated nitrile butadiene rubber (HNBR).

During assembly, the O-rings 224, 226 may be disposed on the piston 204, and the piston 204 may be inserted into the bore 206 of the body 202 via the second end 210. The retaining ring 220 is then disposed in the groove 222 to retain the piston 204 in the body 202 and prevent the piston 204 from falling out of the second end 210 of the body 202. The first and second diameters D1, D2 may also prevent the piston 204 from moving out of the body 202 at the first end 208.

Figure 9:
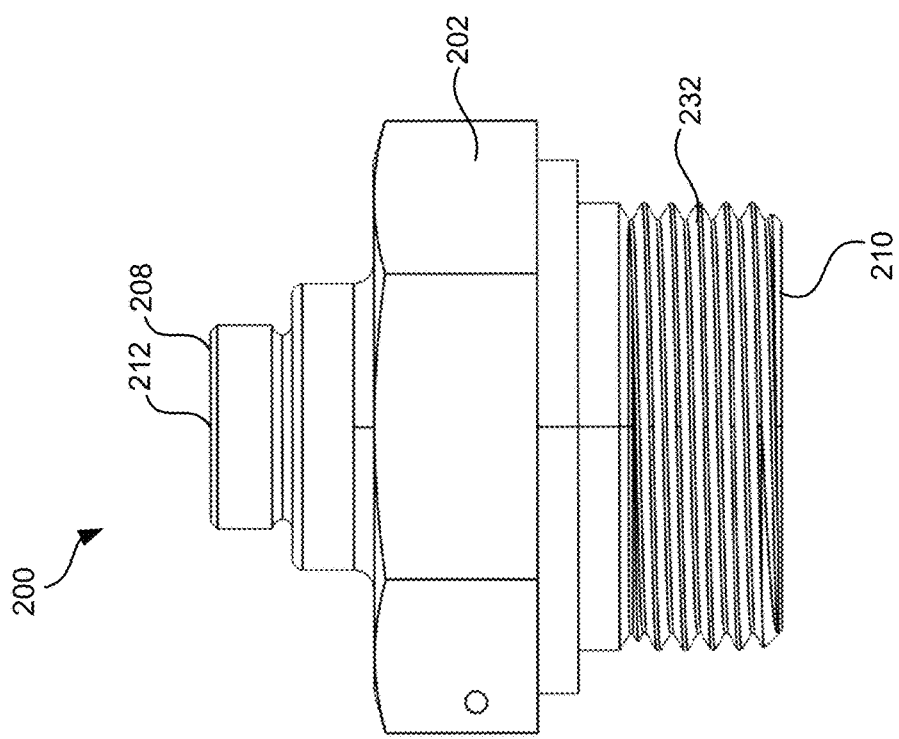
FIG. 9 is a side view of the second indicator of FIG. 7, disposed in a first or retracted position.

Referring to FIGS. 9 and 10, the piston 204 is disposed in a first position or retracted position with respect to the body 202. When disposed in the first position, the first end 212 of the piston 204 is substantially in line or flush with the first end 208 of the body 202. The second end 214 of the piston 204 is also disposed substantially adjacent to the stop 218 (or the retaining ring 220). In this position, the O-rings 224, 226 provide a substantially fluid tight seal between the piston 204 and internal surface of the bore 206 of the body 202. This substantially prevents fluid (liquid or gas) from flowing through the bore 206 as well as a frictional interaction between the O-rings 224, 226 and inner surface of the bore 206.

Figure 11:
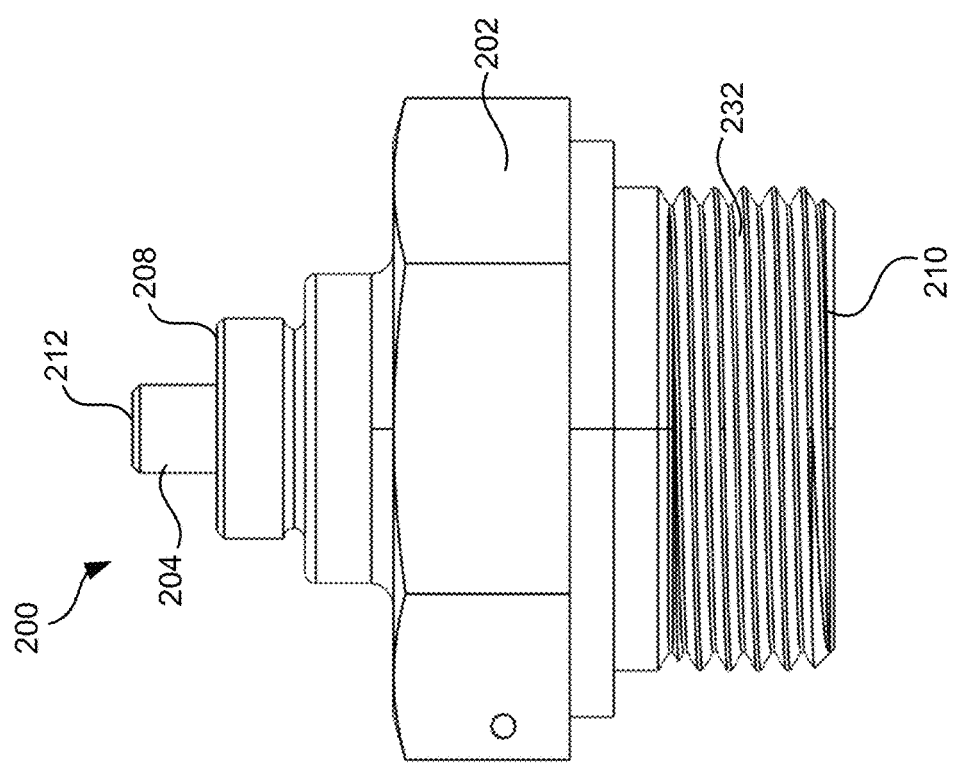
FIG. 11 is a side view of the second indicator of FIG. 7, disposed in a second or extended position.

Referring to FIGS. 11 and 12, the piston 204 is disposed in a second position or extended position with respect to the body 202. In the second position, the first end 212 of the piston 204 is extended from the first end 208 of the body 202. The second end 214 of the piston 204 is also disposed proximal to the angled portion 216, with the second O-ring 226 seated against the angled portion 216. In this position, the O-rings 224, 226 provide a substantially fluid tight seal between the piston 204 and internal surface of the bore 206 of the body 202. This substantially prevents fluid (liquid or gas) from flowing through the bore 206.

In an example, the indicator 200 may be coupled to a pressure relief valve body 300, and function as a cap portion of the pressure relief valve body 300 (as illustrated in FIG. 13). For example, the indicator 200 may include threads 232 that are threaded into the pressure relief valve body 300. The opening of the bore 206 at the second end 210 of the body 202 may function as an inlet port that receives fluid pressure when the pressure relief valve is actuated.

For example, the indicator 200 may initially be disposed with the piston 204 in the first or retracted position (as illustrated in FIGS. 9 and 10). When fluid pressure increases and causes the pressure relief valve to activate, at least a portion of that fluid pressure may enter the opening of the bore 206 at the second end 210 of the body 202 and act on the second end 214 of the piston 204. This causes the piston 204 to move against a frictional interaction caused by the O-rings 224 and/or 226 acting against the internal surface of the bore 206, thus moving the piston 204 to the extended position (as illustrated in FIGS. 11 and 12). The piston 204, being in the extended position, provides a visual indication that an over-pressurization event has occurred, and that pressure relief valve has been activated and may need to be replaced. The piston 204 may also be colored (for example, red, yellow, orange) or other easily identifiable color, to provide a more visually identifiable indication that the pressure relief valve has been actuated, and may need to be replaced.

It should be appreciated that while the pressure relief valve body 300 may require replacing, the indicator 200 may be reused, by decoupling the indicator from the actuated pressure relief valve body 300 and coupling the indicator 200 to a new or replacement pressure relief valve body. The indicator 200 may be reset or placed in the retracted position by pushing or otherwise moving the piston 204 back to the retracted position.

Additionally, the indicator 200 may include a cap 234 coupled to the first end 208 of the body 202. For example, the cap 234 may be press fit onto a flange at the first end 208. The cap 234 may cover and protect the piston 204 from external elements, such as dust, dirt, and/or other elements. The cap 234 may also be transparent to allow the position of the piston 204 to be visually identified without requiring removal of the cap 234. Such a cap may also be incorporated into the indicator 100 in a similar manner.

In another embodiment, referring to FIGS. 14-19, an indicator 400 may be coupled to a solenoid valve or a pressure relief valve, and include a bleed off valve, such as a needle or ball valve. As illustrated in FIGS. 14-19, the indicator 400 includes a body 402 and piston 404 similar to those of the indicators 100/200. However, the body 402 includes a port 436 in a side of the body 402 that couples to a bleed valve 438 (as described in further detail below).

The body 402 includes a bore 406 extending from a first end 408 to a second end 410 of the body 402. The piston 404 is disposed in the bore 406, with a first end 412 disposed proximal to the first end 408 of the body 402, and an opposing second end 414 disposed in the bore 406 between the first and second ends 408, 410 of the body 402.

Figure 19:
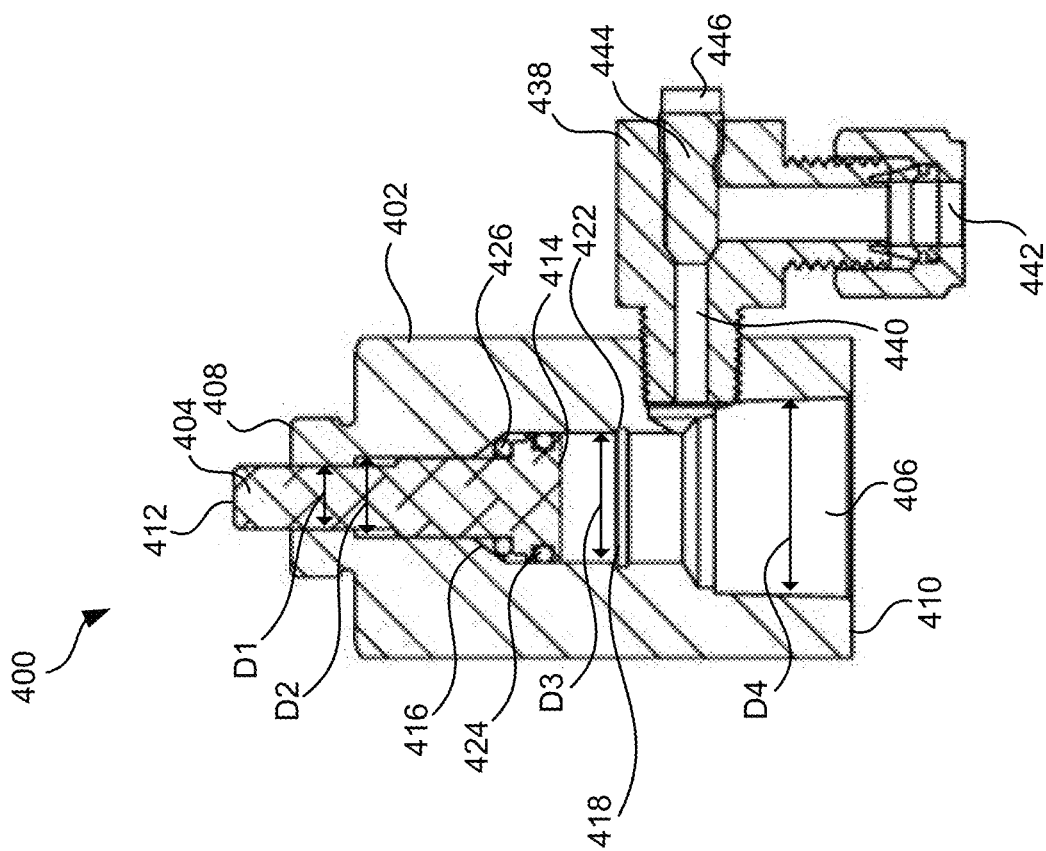
FIG. 19 is a section view of the third indicator of FIG. 18, disposed in the second or extended position.

Referring to FIG. 19, the bore 406 has a first diameter D1 proximal to the first end 408. The bore 408 transitions from the first diameter D1 to a second diameter D2 (larger than the first diameter D1) as the bore 406 extends from the first end 408 in a direction towards the second end 410. The bore 406 also transitions from the second diameter D2 to a third diameter D3 (larger than the second diameter D2) as the bore 406 continues to extend in the direction towards the second end 410. The transition from the second diameter D2 to the third diameter D3 may include an angled portion 416 that may provide a seat for the piston 404, when the piston 404 is in the extended position (as illustrated in FIG. 19, discussed in further detail below). The bore 406 may also have a fourth diameter D4 (larger than the third diameter D3) proximal to the second end 410.

The body 402 may also include a stop 418 disposed between the first and second ends 408, 410, and closer to the first end 408 than the port 436. As illustrated, the stop 418 may include a retaining ring 420 that is disposed in a groove 422 in the body 402 closer to the first end 408 than the port 436.

Figure 16:
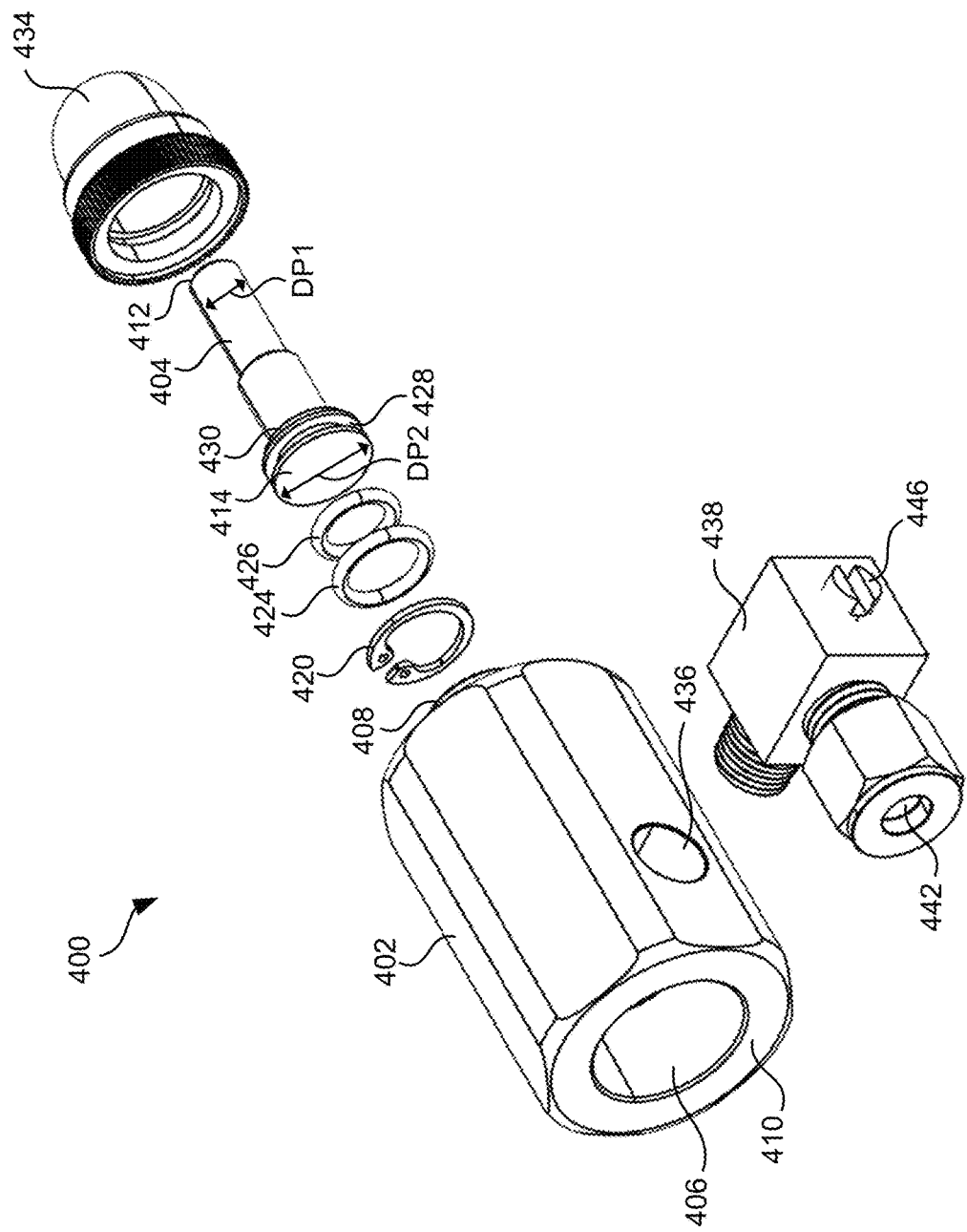
FIG. 16 is an exploded view of the third indicator of FIGS. 14 and 15.

One or more O-rings 424, 226 may also be disposed around the piston 404. Referring to FIG. 16, the piston 404 may include a first piston diameter DP1 proximal to the first end 412 of the piston 404, and a second piston diameter DP2 proximal to the second end 414. The first piston diameter DP1 may be slightly smaller than the first diameter D1 of the bore 406 to allow the piston 404 to slide within the bore 406. The second piston diameter DP2 may also be larger than the second diameter D2 and slightly smaller than the third diameter D3 of the bore 406 to allow the piston 404 to slide within the bore 406.

The piston 404 may also include a groove 428 disposed proximal to the second end 414. The first O-ring 424 may be disposed in the groove 428, and the second O-ring 426 may be disposed on a flange 430 of the piston 404 that is further away from the second end 414 than the groove 428. As described above, the O-rings may be any suitable material. For example in one embodiment, the O-rings may be hydrogenated nitrile butadiene rubber (HNBR).

During assembly, the O-rings 424, 426 may be disposed on the piston 404, and the piston 404 may be inserted into the bore 406 of the body 402 via the second end 410. The retaining ring 420 is then disposed in the groove 422 to retain the piston 404 in the body 402, and prevent the piston 404 from falling out of the second end 410 of the body 402. The first and second diameters D1, D2 may also prevent the piston 404 from moving out of the body 402 at the first end 408.

Figure 17:
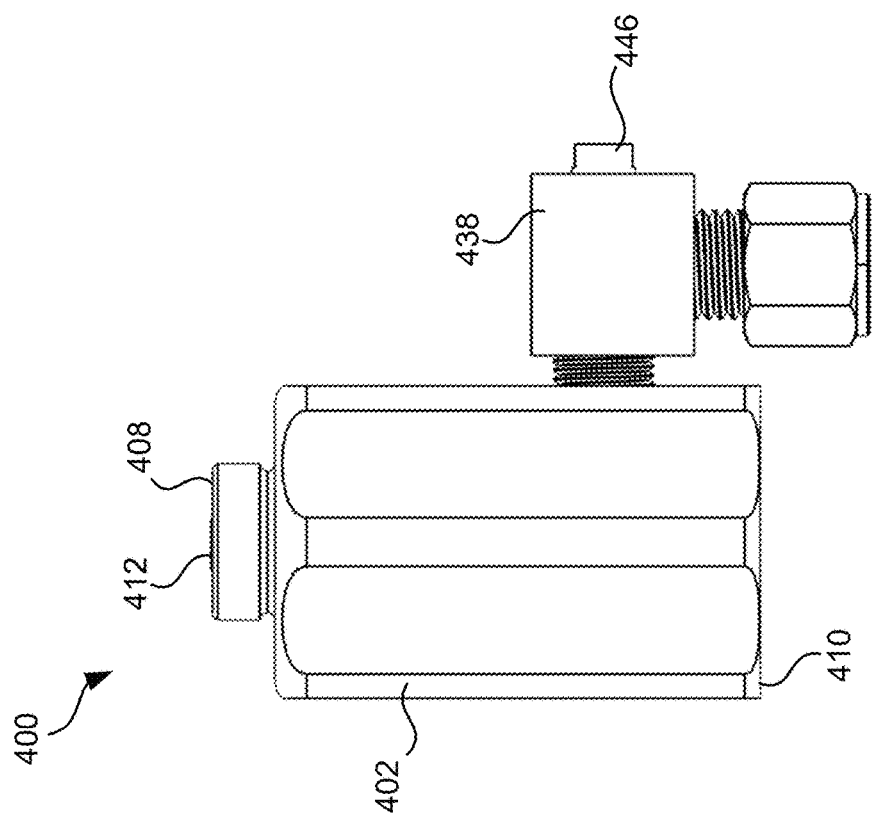
FIG. 17 is a side view of the third indicator of FIG. 14, disposed in a first or retracted position.

Referring to FIG. 17, the piston 404 is in a first position or retracted position with respect to the body 402. In the first position, the first end 412 of the piston 404 is substantially in line or flush with the first end 408 of the body 402. The second end 414 of the piston 404 is also disposed substantially adjacent to the stop 418 (or the retaining ring 420). In this position, the O-rings 424, 426 provide a substantially fluid tight seal between the piston 404 and internal surface of the bore 406 of the body 402. This substantially prevents fluid (liquid or gas) from flowing through the bore 406 as well as a frictional interaction between the O-rings 424, 426 and inner surface of the bore 406.

Figure 18:
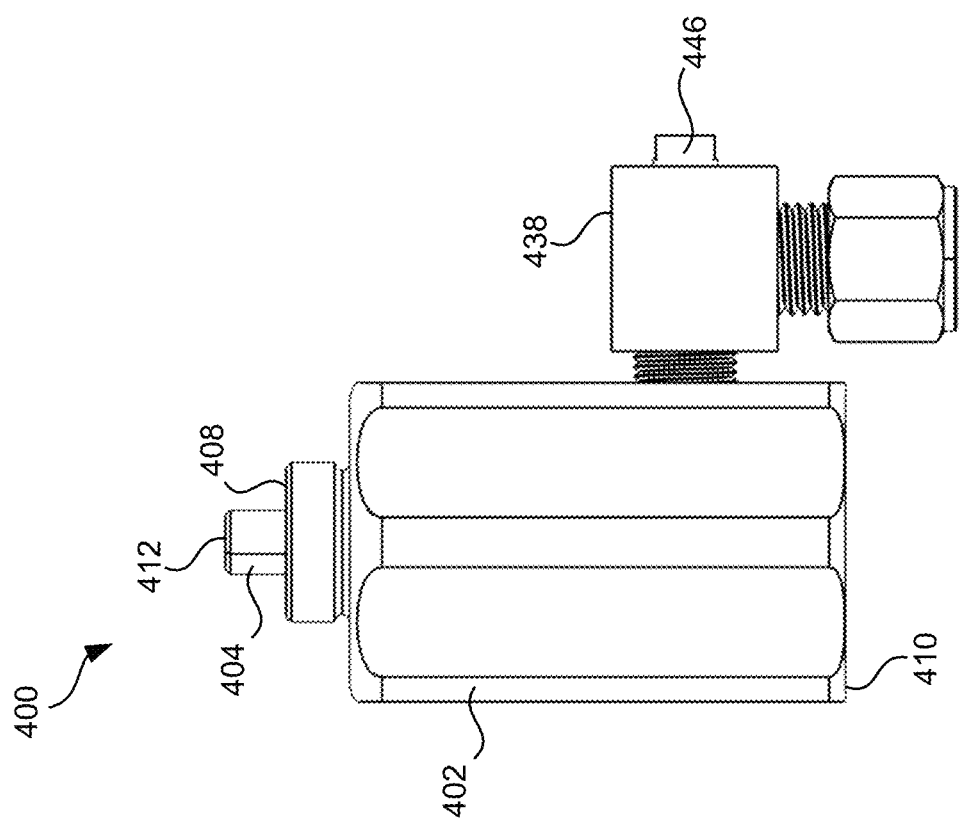
FIG. 18 is a side view of the third indicator of FIG. 14, disposed in a second or extended position.

Referring to FIGS. 18 and 19, the piston 404 is in a second position or extended position with respect to the body 402. In the second position, the first end 412 of the piston 404 is extended from the first end 408 of the body 402. The second end 414 of the piston 404 is also disposed proximal to the angled portion 416, with the second O-ring 426 seated against the angled portion 416. In this position, the O-rings 424, 426 also provide a substantially fluid tight seal between the piston 404 and internal surface of the bore 406 of the body 402. This substantially prevents fluid (liquid or gas) from flowing through the bore 406.

Additionally, the indicator 400 may include a cap 434 coupled to the first end 408 of the body 402. For example, the cap 434 may be press fit onto a flange at the first end 408. The cap 434 may cover and protect the piston 404 from external elements, such as dust, dirt, and/or other elements. The cap 434 may also be transparent to allow the position of the piston 404 to be visually identified without requiring removal of the cap 434.

As mentioned above, the body 402 also includes a port 436 that couples to a valve body 438. The port 436 is disposed in a side of the body 402 between the stop 418 and the second end 410. This allows fluid communication between on opening of the bore 406 at the second end 410 and the port 436. The valve body 438 may be coupled to the port 436, for example, via a threaded connection, or other type of connection.

Referring to FIGS. 16 and 19, the valve body 438 includes an inlet port 440 in fluid communication with the port 436 of the body 402, and an outlet port 442. A valve stem 444 is disposed between the inlet and outlet ports 440, 442 and is movable between open and closed positions. In the open position, fluid communication between the inlet and outlet ports 440, 442 is open or allowed. In the closed position, fluid communication between the inlet and outlet ports 440, 442 is closed or disallowed. As illustrated, the valve stem 444 is installed in the valve body 438 via threaded connection, and has a head 446 that is accessible from an exterior of the valve body 438. This allows manual opening and closing of the valve stem 444 via rotation of the head 446. It should be appreciated that other types of valves may be used instead of the valve stem 444, such as a ball type vale or any other type of openable and closeable valve.

In an example, the indicator 400 may be disposed in a system to identify an over pressurization situation, and allow release of fluid (liquid or gas) via the valve 438 to reduce system pressure. For example, the indicator 400 may be used in conjunction with a solenoid valve. The opening of the bore 406 at the second end 410 of the body 402 may function as an inlet port that receives fluid pressure.

Similar to the embodiments described above, the indicator 400 may initially be disposed with the piston 404 in the first or retracted position (as illustrated in FIG. 17), and the valve stem 444 in the closed position. When fluid pressure increases above a threshold, and acts on the second end 414 of the piston 402, the piston 204 moves against a friction force caused by the O-rings 424 and/or 426 acting against the internal surface of the bore 406, to the extended position (as illustrated in FIGS. 18 and 19). The piston 404 being in the extended position provides a visual indication that the pressure has increased above the threshold, and fluid (liquid or gas) may need to be released from the system. Thus, an operator may rotate the head 446 of valve stem 444 to allow fluid communication between the first and second ports 440 and 442. This allows fluid (liquid or gas) to be removed from the system until the fluid pressure is returned to appropriate operating conditions. Thereafter, the operator may rotate the head 446 of valve stem 444 to close fluid communication between the first and second ports 440 and 442, and reset the position of the piston 404 to the retracted position.

As described above, the piston 404 may also be colored (for example, red, yellow, orange) or other easily identifiable color, to provide a more visually identifiable indication that the pressure has increased above the threshold, and fluid (liquid or gas) may need to be released from the system. For example, the piston 404 may be reset or placed in the retracted position by pushing or otherwise moving the piston 404 back to the retracted position.

Referring to FIG. 20, the body 402 may have alternative designs. For example, the body 402' may include a hexagonally shaped portion 448 proximal to the second end 410 that transitions to a neck portion 450, and to a flanged end 452. It should be appreciated that any of the embodiments 100, 200, 400 may include various hexagonally shaped portions or other geometrically shaped portions, neck portions and/or flanged ends as appropriate.

It will be appreciated that the pressure threshold at which the piston of the present invention slideably moves relative to the body between the first and second positions is determined by the amount of frictional interaction between the O-rings and inner surface of the bore. Thus, the pressure threshold at which the piston moves relative to the bore can be adjusted by modifying the amount of frictional interaction between the O-rings and bore, by, for example, modifying the material or size of the O-ring or the bore, or both.

It should be appreciated that the indicators 100/200/400 may be used in any number of systems that may include or require a pressure relief valve, solenoid valve, or other type of valve. One example of such type of systems may include refrigeration systems that use ammonia or carbon dioxide as a fluid. Other examples of systems include systems that use water, oil, fuel, air, one or more chemicals, etc. as a fluid.

As used herein, the terms "coupled," "coupling," and its functional equivalents are not intended to necessarily be limited to a direct, mechanical coupling of two or more components. Instead, the term "coupled" and its functional equivalents are intended to mean any direct or indirect mechanical, electrical, or chemical connection between two or more objects, features, work pieces, and/or environmental matter. In one example, the term "coupled" and its functional equivalents are intended to mean a threaded connection. "Coupled" is also intended to mean, in some examples, one object being integral with another object.

The matter set forth in the foregoing description and accompanying drawings is offered by way of illustration only and not as a limitation. While particular embodiments have been shown and/or described, it will be apparent to those skilled in the art that changes and modifications may be made without departing from the broader aspects of the invention. The actual scope of the protection sought is intended to be defined in the following claims when viewed in their proper perspective.

What is claimed is:

1. An indicator for a valve, the indicator comprising:
   a body having opposing first and second body ends, the second body end being adapted to be coupled to the valve;
   a bore extending through the body between the first and second body ends, the bore having a first diameter, a second diameter, and an angled portion transitioning between the first and second diameters, the first diameter leading to a first opening in the first body end, the second diameter leading to a second opening in the second body end, the first diameter being smaller than the second diameter;
   a stop disposed in the bore proximal to the second body end, the stop including a retaining ring;
   a piston having opposing first and second piston ends, the second piston end being within the bore, the piston having a groove proximal to the second piston end and a flange between the first piston end and the groove;
   a first O-ring and a second O-ring, the first O-ring being disposed in the groove and adapted to provide a frictional interaction between the first O-ring and an internal surface of the bore, the second O-ring being disposed on the flange;
   the piston being movable between a retracted position and an extended position, wherein the first piston end is within the body in the retracted position, and wherein the first piston end extends outwardly from the body in the extended position;
   wherein the second O-ring is adapted to contact the angled portion when the piston is in the extended position; and
   wherein the piston is adapted to move from the retracted position to the extended position when a threshold pressure is exceeded during an overpressure event of the valve.

2. The indicator of claim 1, wherein the second piston end is disposed adjacent the stop when the piston is in the retracted position.

3. The indicator of claim 1, wherein the valve is a pressure relief valve, and wherein when the pressure relief valve is activated, an overpressure event occurs such that the piston moves from the retracted position to the extended position and the first piston end provides a visual indication that the pressure relief valve has been activated.

4. The indicator of claim 1, further comprising a cap coupled to the first body end and covering the first piston end.

5. The indicator of claim 1, wherein the threshold pressure is based upon at least one of a material of the first O-ring, a size of the first O-ring, and a size of the bore.

6. An indicator for a valve, the indicator comprising:
a body having opposing first and second body ends, the second body end being adapted to be coupled to the valve;
a bore extending through the body between the first and second body ends, the bore having a first diameter, a second diameter, and an angled portion transitioning between the first and second diameters, the first diameter leading to a first opening in the first body end, the second diameter leading to a second opening in the second body end, the first diameter being smaller than the second diameter;
a stop disposed in the bore proximal the second body end;
a piston having opposing first and second piston ends, the second piston end being within the bore, the piston having a groove proximal to the second piston end and a flange between the first piston end and the groove;
a first O-ring and a second O-ring, the first O-ring being disposed in the groove and adapted to provide a frictional interaction between the first O-ring and an internal surface of the bore, the second O-ring being disposed on the flange;
the piston being movable between a retracted position and an extended position, wherein the first piston end is within the body in the retracted position, and wherein the first piston end extends outwardly from the body in the extended position;
a port in a side of the body between the first and second body ends, the port being in fluid communication with the bore;
wherein the second O-ring is adapted to contact the angled portion when the piston is in the extended position; and
wherein the piston is adapted to move from the retracted position to the extended position when a threshold pressure is exceeded during an overpressure event of the valve.

7. The indicator of claim 6, further comprising a valve coupled to the bore, the valve having an inlet port in fluid communication with the bore via the port.

8. The indicator of claim 7, wherein the valve further includes an outlet port and a valve stem disposed between the inlet and outlet ports, wherein the valve stem is movable between an open position that allows fluid communication between the inlet and outlet ports, and a closed position that does not allow fluid communication between the inlet and outlet ports.

9. The indicator of claim 8, wherein the piston provides a visual indication that the valve stem should be placed in the open position when the piston is in the extended position.

10. The indicator of claim 6, wherein the second piston end is disposed adjacent the stop when the piston is in the retracted position.

11. The indicator of claim 6, wherein the valve is a pressure relief valve, and wherein when the pressure relief valve, an overpressure event occurs such that the piston moves from the retracted position to the extended position and the first piston end provides a visual indication that the pressure relief valve has been activated.

12. The indicator of claim 6, further comprising a cap coupled to the first body end and covering the first piston end.

13. The indicator of claim 6, wherein the threshold pressure is based upon at least one of a material of the first O-ring, a size of the first O-ring, and a size of the bore.

* * * * *